(12) United States Patent
Takada et al.

(10) Patent No.: US 10,064,496 B2
(45) Date of Patent: Sep. 4, 2018

(54) HEAD REST DEVICE

(71) Applicants: CLARION CO., LTD., Saitama (JP); TACHI-S CO., LTD., Tokyo (JP)

(72) Inventors: Naoki Takada, Saitama (JP); Fumiaki Nakashima, Saitama (JP); Takao Ishikawa, Saitama (JP); Takahiko Nagasawa, Tokyo (JP); Yasuyuki Ito, Tokyo (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/309,988

(22) PCT Filed: May 14, 2015

(86) PCT No.: PCT/JP2015/063920
§ 371 (c)(1),
(2) Date: Nov. 9, 2016

(87) PCT Pub. No.: WO2015/198738
PCT Pub. Date: Dec. 30, 2015

(65) Prior Publication Data
US 2017/0156503 A1    Jun. 8, 2017

(30) Foreign Application Priority Data

Jun. 27, 2014 (JP) ................. 2014-132669

(51) Int. Cl.
*A47C 7/62* (2006.01)
*A47C 31/00* (2006.01)
(Continued)

(52) U.S. Cl.
CPC .................. *A47C 7/72* (2013.01); *A47C 7/38* (2013.01); *B60N 2/4876* (2013.01); *B60N 2/879* (2018.02); *B64D 11/0015* (2013.01)

(58) Field of Classification Search
CPC .... A47C 7/72; A47C 7/38; A47C 7/36; A47C 7/62; B60N 2/4876; B60N 2/48; B64D 11/0015
(Continued)

(56) References Cited

U.S. PATENT DOCUMENTS 4,638,884 A * 1/1987 Lee .................. H04R 5/023
181/141
4,681,366 A * 7/1987 Lobanoff ............. B60N 2/4876
248/475.1
(Continued)

FOREIGN PATENT DOCUMENTS

DE    102004008815 A1   9/2009
JP    11-113080 A        4/1999
(Continued)

OTHER PUBLICATIONS

International Preliminary Report on Patentability issued for corresponding PCT/JP2015/063920.
(Continued)

*Primary Examiner* — Mark R Wendell
(74) *Attorney, Agent, or Firm* — IP Business Solutions, LLC

(57) ABSTRACT

There is provided a head rest device 10 that does not impair safety of a seated person even when a secondary battery 35 is accommodated therein.

An accommodation space 28 partitioned by a partitioning plate part 25 is provided inside a cushioning core material 12 of a head rest main body, and a secondary battery 35 is accommodated inside the accommodation space 28.

7 Claims, 5 Drawing Sheets

(51) Int. Cl.
*A47C 7/72* (2006.01)
*B60N 2/48* (2006.01)
*B64D 11/00* (2006.01)
*A47C 7/38* (2006.01)
*B60N 2/879* (2018.01)

(58) Field of Classification Search
USPC .................................................. 297/217.3
See application file for complete search history.

(56) References Cited

U.S. PATENT DOCUMENTS

| | | | | |
|---|---|---|---|---|
| 4,702,519 A * | 10/1987 | Lobanoff | ............. | B60N 2/4876 297/185 |
| 5,287,412 A * | 2/1994 | Etzel | .................. | B60R 11/0217 181/156 |
| 5,984,415 A * | 11/1999 | Schumacher | .......... | B60N 2/468 244/118.5 |
| 6,094,496 A * | 7/2000 | Stowers, Sr. | .......... | H04R 5/023 381/361 |
| 6,402,238 B1 * | 6/2002 | Bigi | ....................... | B60N 2/427 297/216.12 |
| 6,904,157 B2 * | 6/2005 | Shima | .................... | H04R 1/025 381/333 |
| 6,991,289 B2 * | 1/2006 | House | ..................... | A47C 7/72 297/217.4 |
| 9,327,628 B2 * | 5/2016 | Subat | .................... | B60N 2/4876 |
| 9,699,537 B2 * | 7/2017 | Oswald | ................. | H04R 1/025 |
| 2006/0047426 A1 * | 3/2006 | Vitito | ..................... | B60K 35/00 701/469 |
| 2014/0152057 A1 * | 6/2014 | Truant | ................. | B60N 2/4876 297/180.12 |

FOREIGN PATENT DOCUMENTS

| | | | |
|---|---|---|---|
| JP | 2002-172042 | A | 6/2002 |
| JP | 2009-247388 | A | 10/2009 |
| JP | 2015-98287 | A | 5/2015 |

OTHER PUBLICATIONS

Written Opinion of the International Searching Authority issued for corresponding PCT/JP2015/063920.
International Search Report issued for corresponding PCT/JP2015/063920 application.
Written Opinion of the International Search Authority issued for corresponding PCT/JP2015/063920 application.
Extended European Search Report mailed by European Patent Office dated Jan. 25, 2018 in the corresponding European patent application No. 15812590.6-1010.
Japanese Office Action mailed by Japanese Patent Office dated Jan. 16, 2018 in the corresponding Japanese patent application No. 2014-132669.

* cited by examiner

HEAD REST DEVICE

TECHNICAL FIELD

The present invention relates to a head rest device.

BACKGROUND ART

Conventionally, there is known a head rest device having a box-shaped loudspeaker implemented in a casing member of a head rest of a seat (for example, see Patent Literature 1).

CITATION LIST

Patent Literature

Patent Literature 1: Japanese Patent Laid-Open No. 2009-247388

SUMMARY OF INVENTION

Technical Problem

However, when a digital speaker is used as the loudspeaker or voice information is sent and received through communication in the conventional head rest device, a control circuit board is needed to be provided inside the head rest device. Therefore, also a secondary battery for supplying power to operate the control circuit board is needed to be placed inside the head rest device.

In such a case, for the secondary battery such as a lithium ion battery, an organic solvent is used and it has recently been found that an electrolyte solution with the organic solvent is evaporated when a short circuit or the like occurs inside, which causes generation of gas. Further, it has also been confirmed that in the case of the short circuit, rapid overheat can cause firing when the concentration of the gas increases, and in some cases, it can cause rupture of the secondary battery or the like.

Accordingly, when the secondary battery is placed in the head rest device, the generation of the gas, the firing, the rupture or the like is to occur near the head of a seated person, which can problematically cause safety to be impaired.

The present invention is devised in view of the aforementioned circumstances and an object thereof is to provide a head rest device that does not impair safety of a seated person even when a secondary battery is accommodated therein.

Solution to Problem

In order to achieve the object, the present invention is characterized in that an accommodation space partitioned by a partitioning plate is provided inside a core material of a head rest main body, and a secondary battery is accommodated inside the accommodation space.

Moreover, in the aforementioned configuration, the accommodation space may be placed at a lower part of the core material. Moreover, the accommodation space may take a configuration having a guiding port opening toward a lower side of the core material. Furthermore, the accommodation space may take a configuration including a groove for causing a wall face of the accommodation space to break when an internal pressure increases.

Moreover, in the aforementioned configuration, a configuration may be taken in which a protective cushioning material is provided on a surface of the core material and on a front side of the accommodation space. Moreover, a configuration may be taken in which a thickness of the core material on a front side of the accommodation space is made large. Furthermore, a configuration may be taken in which a protective plate is provided on a front side of the accommodation space.

Advantageous Effects of Invention

According to the present invention, safety can be prevented from being impaired even when a secondary battery is accommodated in a head rest device.

DESCRIPTION OF EMBODIMENTS

Hereafter, embodiments of the present invention are described with reference to the drawings.

Figure 1:
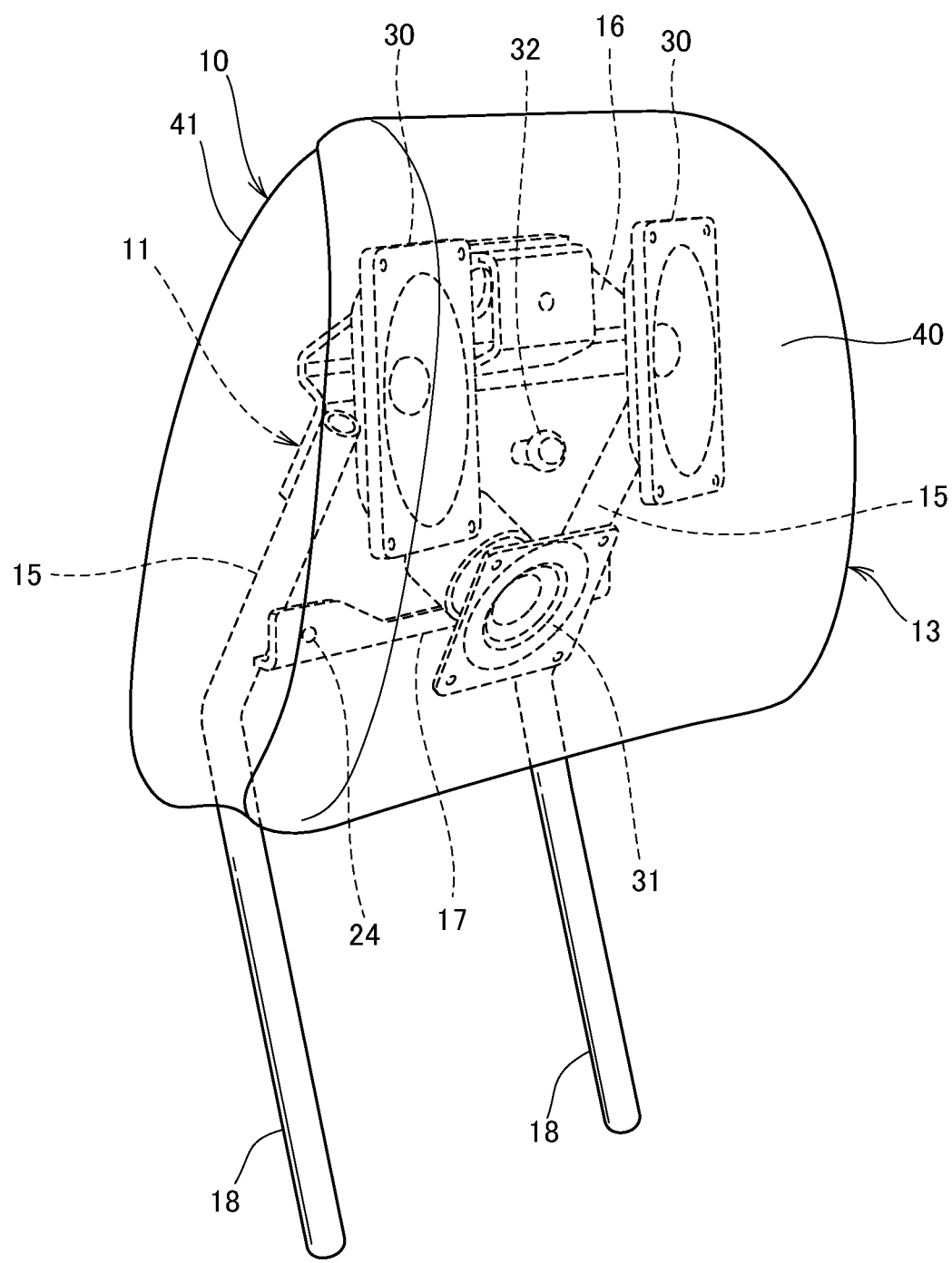
FIG. 1 is a perspective view showing a first embodiment of a head rest device according to the present invention.
Figure 2:
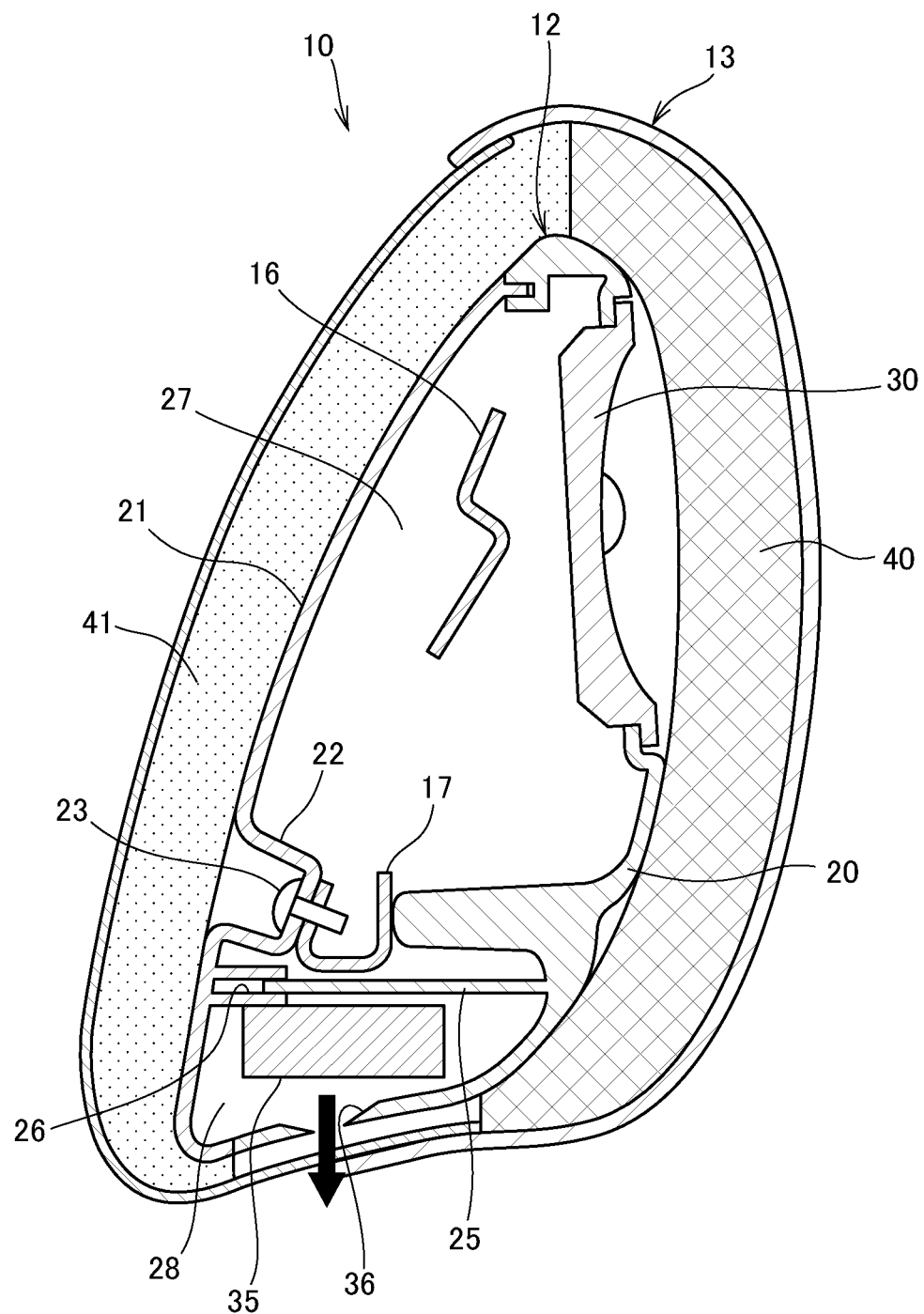
FIG. 2 is a vertical cross-sectional view of the head rest device.

FIG. 1 and FIG. 2 show a first embodiment of a head rest device according to the present invention. FIG. 1 is a perspective view showing a head rest device 10 and FIG. 2 is a vertical cross-sectional view of the head rest device 10.

The head rest device 10 is provided on an occupant seat disposed in a vehicle room. As the vehicle room, for example, vehicle rooms of an automobile, a train, an airplane, a ship and the like can be cited. In the present embodiment, the head rest device 10 that is provided on a front seat of an automobile, a seat where a driver is seated, is exemplarily described.

The head rest device 10 is attached to an upper part of a backrest part of a seat where a driver is seated (not shown). The head rest device 10 includes a metal frame 11 as a framework of the head rest device 10, a cushioning core material 12 as a core material of a head rest main body joined to the frame 11, and a cushion 13 which is provided to cover the periphery of the cushioning core material 12 and receives the head of the seated person.

The frame 11 includes a pair of pipe-shaped main frames 15 and 15 which line up in the right-left direction and extend in the vertical direction, an upper cross member 16 joining upper end parts of the main frames 15 and 15 together, a lower cross member 17 joining the main frames 15 and 15 together below the upper cross member 16, and attachment stays 18 inserted from an upper face of the backrest part of the seat and fixing the main frames 15. The head rest device 10 is configured such that the position in height of attachment can be changed according to the physical constitution of the seated person or the like by adjusting the depth in insertion of the attachment stays 18.

The cushioning core material 12 includes a substantially box-shaped front-side casing 20 opening rearward and a substantially box-shaped rear-side casing 21 opening frontward, and is formed into a sealed box shape by bonding the front-side casing 20 and the rear-side casing 21 together at their opening portions. The front-side casing 20 and the rear-side casing 21 are formed, for example, of a resin material such as ABS resin and polypropylene resin.

A plurality of fixing parts (partly shown only for the rear-side casing 21) 22 are provided in each of the front-side casing 20 and the rear-side casing 21. A plurality of fixing hole parts 24 are provided in the upper cross member 16 and the lower cross member 17. Further, the front-side casing 20 and the rear-side casing 21 are configured to be fixed to the frame 11 by longitudinally sandwiching the frame 11 to bond the contact faces of their openings together, and fastening bolts 23 from the fixing parts of the front-side casing 20 and the fixing parts 22 of the rear-side casing 21 to the fixing hole parts 24 of the upper cross member 16 and the lower cross member 17.

Moreover, as shown in FIG. 2, a partitioning plate part 25 substantially horizontally extending toward the rear-side casing 21 side is provided inside a lower part of the front-side casing 20, and an engaging part 26 which a rear end of the partitioning plate part 25 engages is provided in the rear-side casing 21.

The space inside the cushioning core material 12 is partitioned by the partitioning plate part 25 as a partitioning plate into an enclosure space 27 in its upper part and an accommodation space 28 positioned below the enclosure space 27. Notably, while the partitioning plate part 25 is configured as a part of the front-side casing 20, it may be configured separately from the front-side casing 20.

As shown in FIG. 1, on a front face of the enclosure space 27 of the cushioning core material 12, for example, a pair of right and left acoustic speakers 30 and 30 which are digital speakers and a subwoofer 31 positioned between and below these acoustic speakers 30 and 30 are respectively provided. Further, by the enclosure space 27 of the cushioning core material 12 functioning as an enclosure of the loudspeakers, the acoustic speakers 30 and the subwoofer 31 are configured so as to be able to output, for example, voice guidance of a car navigation system, speech voice of a mobile phone or a smart phone, voice of a car audio, or the like in excellent sound quality.

Moreover, an acoustic microphone 32 is provided between the acoustic speakers 30. The acoustic microphone 32 is one used, for example, for voice instruction of a car navigation system, hands-free call of a mobile phone or a smart phone, or the like.

On the frame 11, for example, at a portion of the upper cross member 16 thereof, a control circuit board (not shown) in which a voice signal processing circuit which converts and processes a voice signal sent from the outside into a digital speaker voice signal to operate the acoustic speakers 30 and the subwoofer 31, a control circuit for controlling the acoustic microphone 32, and the like are implemented is provided. Moreover, a secondary battery 35 for supplying power to the control circuit board is accommodated inside the accommodation space 28.

In the present embodiment, a guiding port 36 is formed on a bottom face of the accommodation space 28. The guiding port 36 is for discharging gas generated from the rechargeable secondary battery 35 to the outside. Namely, in the case where the secondary battery 35 is a lithium ion battery, gas is sometimes ejected from the secondary battery 35 caused by internal short circuit in the secondary battery 35 or the like. The head rest device 10 is configured such that gas is caused not to stay inside the accommodation space 28 by providing the guiding port 36 to the accommodation space 28, and thereby, is configured such that firing caused by an increase of gas density or the like can be prevented from occurring before happening. Moreover, the guiding port 36 has a function of allowing the influence to escape to the seat side, the influence being of the case where the secondary battery 35 ruptures due to gas generated from the secondary battery 35.

As shown in FIG. 2, the cushion 13 includes a front face cushioning part 40 covering the front face of the cushioning core material 12 and a rear part-side cushioning part 41 covering the remaining face of the cushioning core material 12. The front face cushioning part 40 and the rear part-side cushioning part 41 are formed into a bag shape by being joined together at their edge parts, and are attached onto the cushioning core material 12 to cover it.

The front face cushioning part 40 is a three-dimensional net-shaped cushioning body configured into a three-dimensional net shape by knitting a fiber body, and is a so-called fiber pad. As the fiber body, for example, a fiber body of polypropylene, and a mixed fiber body of polypropylene and polyethylene terephthalate can be cited. The front face cushioning part 40 has high cushioning ability, and has high sound passing ability and air permeability resulting from its three-dimensional net-shaped structure.

Moreover, the rear part-side cushioning part 41 is constituted of two layers of an attenuating layer constituted of a material that attenuates sound in high efficiency and a sound shielding layer constituted of a material that has high sound shielding ability. The attenuating layer is constituted of resin that has high sound absorbing performance and high cushioning ability, such, for example, as urethane. The sound shielding layer is constituted of a soft resin material that can be sewed and has high sound attenuating ability and sound shielding ability, such, for example, as an olefin-based thermoplastic elastomer. The rear part-side cushioning part 41 has cushioning ability as a head rest and is constituted of a material that can efficiently attenuate and shield sound.

Next, operation of the present embodiment is described.

In the present embodiment, since the acoustic speakers 30 and the subwoofer 31 are provided in the head rest device 10, for example, voice guidance of a car navigation system, speech voice of a mobile phone or a smart phone, voice of a car audio, or the like can be outputted from the acoustic speakers 30 and the subwoofer 31 in excellent sound quality. Moreover, by providing the acoustic microphone 32, for example, voice instruction of a car navigation system, hands-free call of a mobile phone or a smart phone, or the like can be properly performed.

Further, in the present embodiment, when gas is generated from the inside of the secondary battery 35 due to short circuit of the secondary battery 35 or the like, the gas can be allowed to escape through the guiding port 36 below the cushioning core material 12, which can prevent the gas from staying inside the accommodation space 28. Moreover, even when the secondary battery 35 ruptures due to the gas generated from the secondary battery 35, the guiding port 36 can allow the influence to escape to the seat side.

As mentioned above, according to the present embodiment, the accommodation space 28 partitioned by the partitioning plate part 25 is provided inside the cushioning core material 12, and the secondary battery 35 is accommodated inside the accommodation space 28. Hence, even when the secondary battery 35 is accommodated in the head rest device 10, safety can be prevented from being impaired.

Moreover, since the guiding port 36 is provided, when gas is generated from the secondary battery 35, the gas can be quickly allowed to escape outside the cushioning core material 12. As a result, the concentration of the gas can be securely prevented from increasing inside the accommodation space 28, and firing of the secondary battery 35 or the like in the accommodation space 28 can be securely prevented. Moreover, since the accommodation space 28 is disposed at a lower part of the cushioning core material 12, gas generated from the secondary battery 35 can be guided toward the seat, which can reduce the influence of the gas on the seated person as much as possible. Moreover, since even when the secondary battery 35 ruptures, the influence due to the rupture of the secondary battery 35 can be allowed to escape to the seat side through the guiding port 36, which can securely protect the seated person.

Notably, in the case of no passenger behind the seat, for example, in a two-seater vehicle or the like, the guiding port 36 may be formed at a rear part of the cushioning core material 12.

Next, a second embodiment of the present invention is described.

Figure 3:
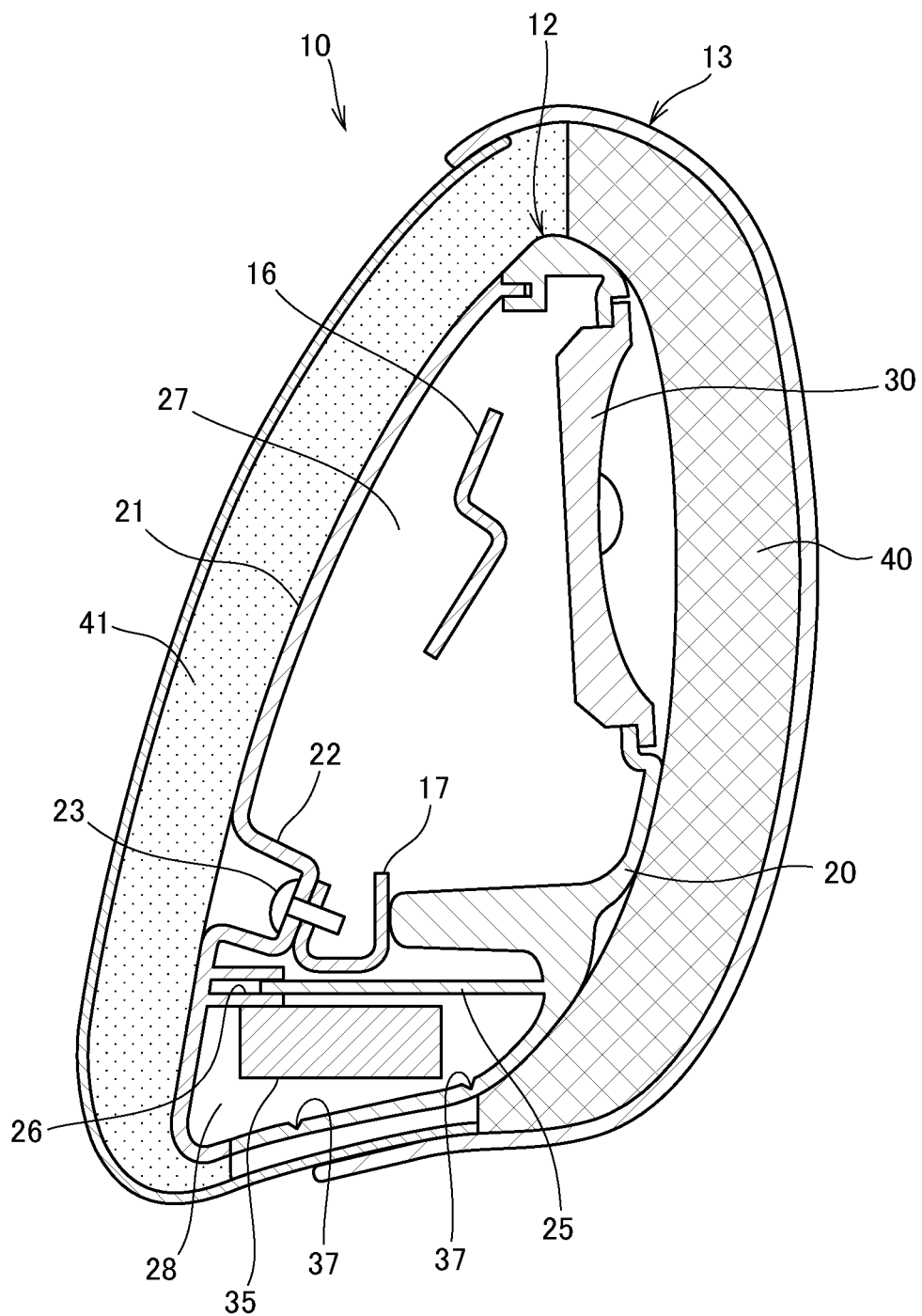
FIG. 3 is a vertical cross-sectional view showing a second embodiment of the head rest device according to the present invention.

FIG. 3 is a vertical cross-sectional view of the head rest device 10 showing the second embodiment of the present invention. In the present embodiment, grooves 37 and 37 are formed at two places of the front-side casing 20 which are on the bottom face of the accommodation space 28. The grooves 37 are formed by cutting away the bottom face of the front-side casing 20 from the inside of the accommodation space 28, and the grooves 37 are configured to deliberately weaken the strength of the bottom face of the accommodation space 28.

The other configurations are similar to those shown for the first embodiment, and the same portions are given the same signs to omit their description.

In the present embodiment, the accommodation space 28 is completely partitioned by the partitioning plate part 25 from the enclosure space 27, hence when inside it, gas is generated from the secondary battery 35 due to short circuit of the secondary battery 35 or the like and the internal pressure of the gas in the accommodation space 28 increases, since the grooves 37 weaken the strength of the bottom face of the accommodation space 28, the bottom face of the accommodation space 28 breaks from the portions of the grooves 37, and thereby, the accommodation space 28 is released to the outside to prevent firing caused by an increase of gas density or the like from occurring before happening. Moreover, since even when the secondary battery 35 ruptures due to gas generated from the secondary battery 35, the internal pressure of the accommodation space 28 increases, and the bottom face of the accommodation space 28 breaks from the portions of the grooves 37, the influence due to the rupture of the secondary battery 35 can be allowed to escape to the seat side.

As mentioned above, in the present embodiment, since the grooves 37 are provided on the bottom face of the accommodation space 28 and when gas is generated from the secondary battery 35 to increase the internal pressure of the accommodation space 28, the grooves 37 cause the bottom face of the accommodation space 28 to break and allow the gas to escape to the outside of the cushioning core material 12, the concentration of the gas can be securely prevented from increasing inside the accommodation space 28, which can securely prevent firing of the secondary battery 35 or the like in the accommodation space 28. Moreover, since even when the secondary battery 35 ruptures, the bottom face of the accommodation space 28 can be caused to break from the portions of the grooves 37 and the influence due to the rupture of the secondary battery 35 can be allowed to escape to the seat side, the seated person can be securely protected.

Next, a third embodiment of the present invention is described.

Figure 4:
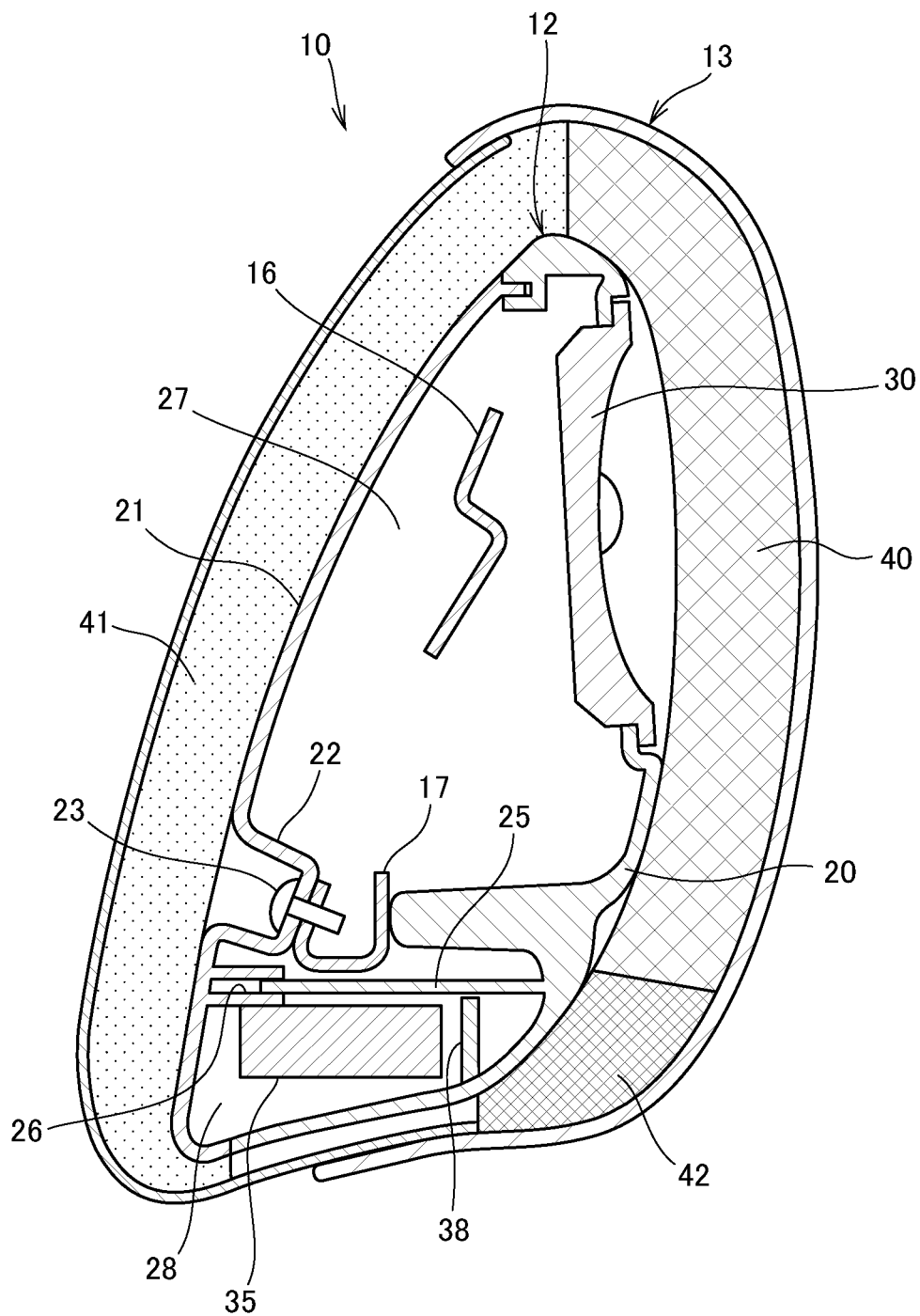
FIG. 4 is a vertical cross-sectional view showing a third embodiment of the head rest device according to the present invention.

FIG. 4 is a vertical cross-sectional view of the head rest device 10 showing the third embodiment of the present invention. In the present embodiment, a protective plate 38 is provided at a front part of the accommodation space 28 (on the seated person side thereof). Moreover, a protective cushioning material 42 such, for example, as urethane is disposed in the front face cushioning part 40 and on the front part of the accommodation space 28.

The front face cushioning part 40 is a three-dimensional net-shaped cushioning body configured into a three-dimensional net shape by knitting a fiber body as mentioned above, and this is configured such that protection in front of a lower part of the cushioning core material 12 is enhanced by disposing the protective cushioning material 42 that has relatively high cushioning ability on a front part of the accommodation space 28.

The other configurations are similar to those shown for the first embodiment, and the same portions are given the same signs to omit their description.

In the present embodiment, in the case where gas is generated from the secondary battery 35 due to short circuit of the secondary battery 35 or the like, when an increase of the concentration of the gas causes firing or rupture of the secondary battery 35, the protective plate 38 can check the influence thereof, and furthermore, even if the protective plate 38 breaks, to provide the protective cushioning material 42 enables the protective cushioning material 42 to receive the influence of the firing or the rupture of the secondary battery 35 or the like.

As mentioned above, in the present embodiment, since the protective plate 38 is provided at the front part of the accommodation space 28 and the protective cushioning material 42 is provided thereon, when an increase of the concentration of gas causes firing or rupture of the secondary battery 35, the protective plate 38 can check the influence thereof, and furthermore, the protective cushioning material 42 can receive the influence of the firing or the rupture of the secondary battery 35 or the like, which can, as a result, securely protect the seated person.

Notably, in the present embodiment, while to provide both of the protective plate 38 and the protective cushioning material 42 is exemplarily described, any one of them may be solely provided.

Moreover, while the protective cushioning material 42 such as urethane is provided on the outside of the cushioning core material 12, the thickness of the protective cushioning material 42 itself may be made larger, or the thickness of the cushioning core material 12 may also be made larger.

Next, a fourth embodiment of the present invention is described.

Figure 5:
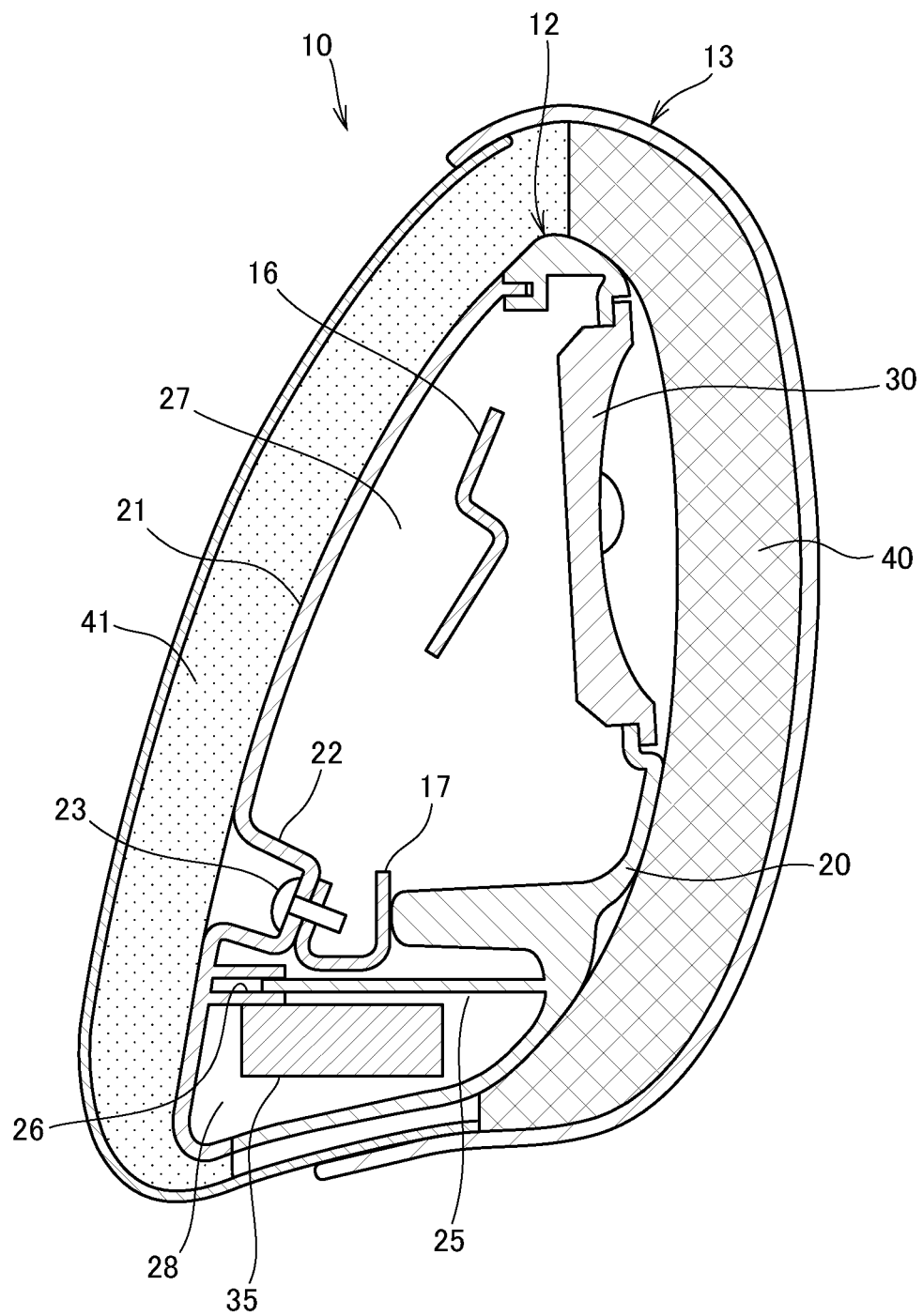
FIG. 5 is a vertical cross-sectional view showing a fourth embodiment of the head rest device according to the present invention.

FIG. 5 is a vertical cross-sectional view of the head rest device 10 showing the fourth embodiment of the present invention. In the present embodiment, the accommodation space 28 is configured to be completely sealed. Further, the front-side casing 20, the rear-side casing 21 and the partitioning plate part 25 which constitute the accommodation space 28 are formed of a flameproof material and the like, for example, containing a self-extinguishing agent.

The other configurations are similar to those shown for the first embodiment, and the same portions are given the same signs to omit their description.

In the present embodiment, in the case where gas is generated from the secondary battery 35 due to short circuit of the secondary battery 35 or the like, when an increase of the concentration of the gas causes firing or rupture of the secondary battery 35, the influence is checked inside the accommodation space 28. Namely, in the case of the firing of the secondary battery 35, since the accommodation space 28 being a sealed space limits the amount of oxygen therein, the fire can be extinguished at an early stage. Moreover, by using a flameproof material for the accommodation space 28, even in the case of the firing, the fire can be securely prevented from spreading to other places. Moreover, even in the case of the rupture of the secondary battery 35, the influence thereof can be checked inside the accommodation space 28.

As mentioned above, in the present embodiment, since the accommodation space 28 is a completely sealed space, in the case of firing of the secondary battery 35 or rupture of the secondary battery 35, the influence can be checked inside the accommodation space 28, which can, as a result, securely protect the seated person.

Notably, the aforementioned embodiments present an aspect of application of the present invention and the present invention is not limited to the aforementioned embodiments.

For example, one in the first embodiment and one in the third embodiment may be combined. In such a configuration, to provide the guiding port 36 can allow gas to escape to the outside, and the protective plate 38 and the protective cushioning material 42 can protect the seated person side. Likewise, one in the second embodiment and one in the third embodiment may be combined. In such a configuration, when gas causes the inside of the accommodation space 28 to become at a high pressure, the grooves 37 can allow the bottom face of the accommodation space 28 to break for its escape to the outside, and the protective plate 38 and the protective cushioning material 42 can protect the seated person side.

REFERENCE SIGNS LIST

10 Head rest device
12 Cushioning core material
13 Cushion
20 Front-side casing
21 Rear-side casing
25 Partitioning plate part
28 Accommodation space
35 Secondary battery
36 Guiding port
37 Groove
38 Protective plate
42 Protective cushioning material

The invention claimed is:

1. A head rest device comprising:
a head rest main body including a core material which surrounds a casing; and
a partitioning plate partitioning inside the casing, and separating between an enclosure space and an accommodation space which is positioned below the enclosure space,
wherein a secondary battery is accommodated inside the accommodation space of the casing and is covered by the partitioning plate, and
the accommodation space of the casing has a guiding port that is formed on a bottom face of the casing and that penetrates the bottom face to open toward a lower side of the core material.

2. The head rest device according to claim 1, wherein the accommodation space is placed at a lower part of the core material.

3. The head rest device according to claim 1, wherein the accommodation space includes a groove for causing a wall face of the accommodation space to break when an internal pressure increases.

4. The head rest device according to claim 1, wherein a protective cushioning material is provided on a surface of the core material and on a front side of the accommodation space.

5. The head rest device according to claim 1, wherein a protective plate is provided on a front side of the accommodation space.

6. The head rest device according to claim 1, wherein at least one speaker is disposed in the enclosure space of the casing.

7. The head rest device according to claim 1, wherein a microphone is disposed in the enclosure space of the casing.

* * * * *